United States Patent
Bouyoucos et al.

(10) Patent No.: US 6,870,795 B2
(45) Date of Patent: Mar. 22, 2005

(54) ACOUSTIC SOURCE ARRAY SYSTEM MODULE FOR UNDERWATER OPERATION WHICH CAN BE INSTALLED ON A MOTORIZED BOAT

(75) Inventors: John V. Bouyoucos, Rochester, NY (US); Dennis R. Courtright, Canandaigua, NY (US)

(73) Assignee: Hydroacoustics Inc., Rochester, NY (US)

( * ) Notice: Subject to any disclaimer, the term of this patent is extended or adjusted under 35 U.S.C. 154(b) by 7 days.

(21) Appl. No.: 10/333,491

(22) PCT Filed: Jan. 24, 2002

(86) PCT No.: PCT/US02/02081

§ 371 (c)(1),
(2), (4) Date: Jan. 21, 2003

(87) PCT Pub. No.: WO02/061958

PCT Pub. Date: Aug. 8, 2002

(65) Prior Publication Data

US 2004/0013041 A1 Jan. 22, 2004

Related U.S. Application Data

(60) Provisional application No. 60/265,032, filed on Jan. 30, 2001, provisional application No. 60/290,056, filed on May 10, 2001, and provisional application No. 60/309,648, filed on Aug. 2, 2001.

(51) Int. Cl.[7] ............................................... H04R 1/00
(52) U.S. Cl. ....................................................... 367/144
(58) Field of Search ................................ 367/173, 165, 367/16, 144, 153

(56) References Cited

U.S. PATENT DOCUMENTS

| 4,380,808 | A | * | 4/1983 | Hill et al. ................... 367/153 |
|---|---|---|---|---|
| 5,469,404 | A | * | 11/1995 | Barber et al. .................. 367/16 |
| 5,841,733 | A | * | 11/1998 | Bouyoucos et al. .......... 367/15 |
| 5,995,452 | A | * | 11/1999 | Bouyoucus ................. 367/153 |
| 6,061,635 | A | * | 5/2000 | Barber, Sr. ................... 702/14 |
| 2004/0013041 | A1 | * | 1/2004 | Bouyoucus et al. ........ 367/144 |

* cited by examiner

Primary Examiner—Daniel Pihulic
(74) Attorney, Agent, or Firm—Martin Lukacher

(57) ABSTRACT

A small boat or launch such as a motorized reinforced hull inflatable boat provides a platform for an acoustic source array of airguns. The array is made up as a ladder structure in which the airguns are disposed horizontally between vertical support and umbilical lines, preferably with their discharge ports in laterally offset or staggered relationship to minimize undesirable interactions between the acoustic transmissions released into the water by the sources and to help maximize the acoustic output of the array for a given array length. A structure stows the array on the boat for transport when the array is not deployed for use. If desired, the stowed array may be substantially enclosed by the hull of the boat. The stowage structure is preferable defined by a track or rails on the top of the deck. Umbilical cables attached to the array are translated, as by being wound on a drum and unwound therefrom, to deploy or retrieve the array over the stern of the boat. The umbilicals provide power (compressed air to the airguns and control signals for timed actuation of the guns). The array may be part of a module which includes a winch for winding and unwinding the umbilicals to retrieve and deploy the array. The array system also includes a compressor for supplying compressed air to the airguns of the array.

21 Claims, 15 Drawing Sheets

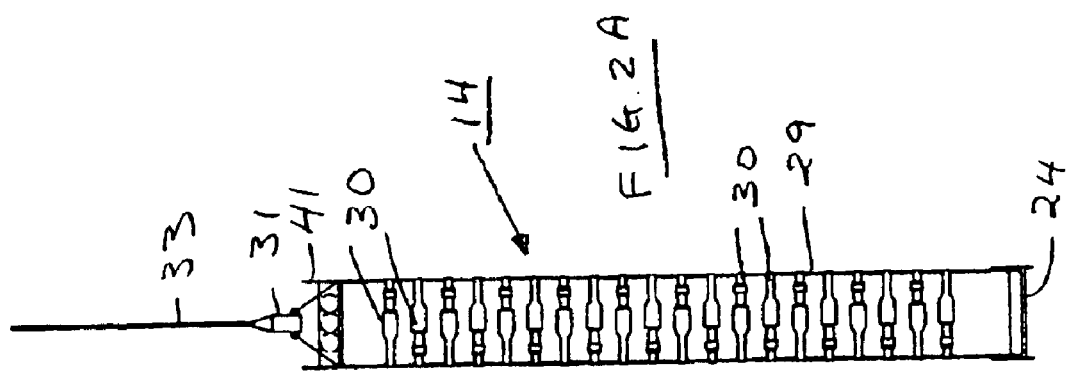
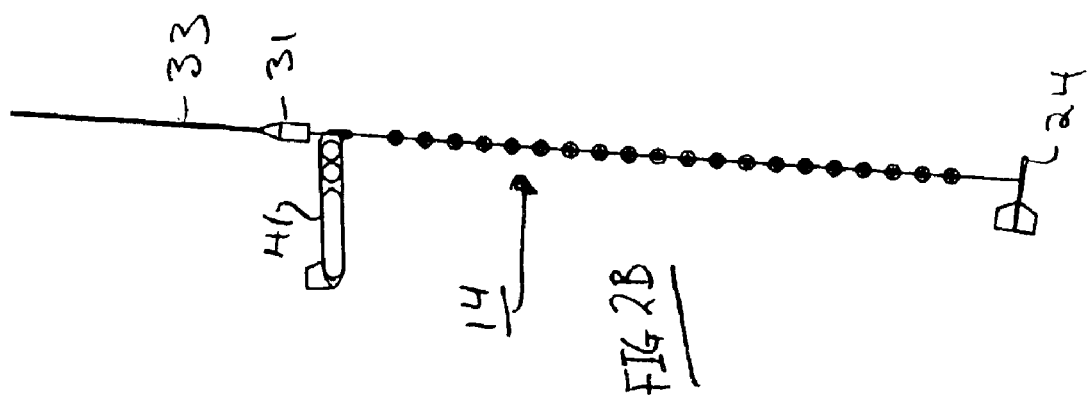

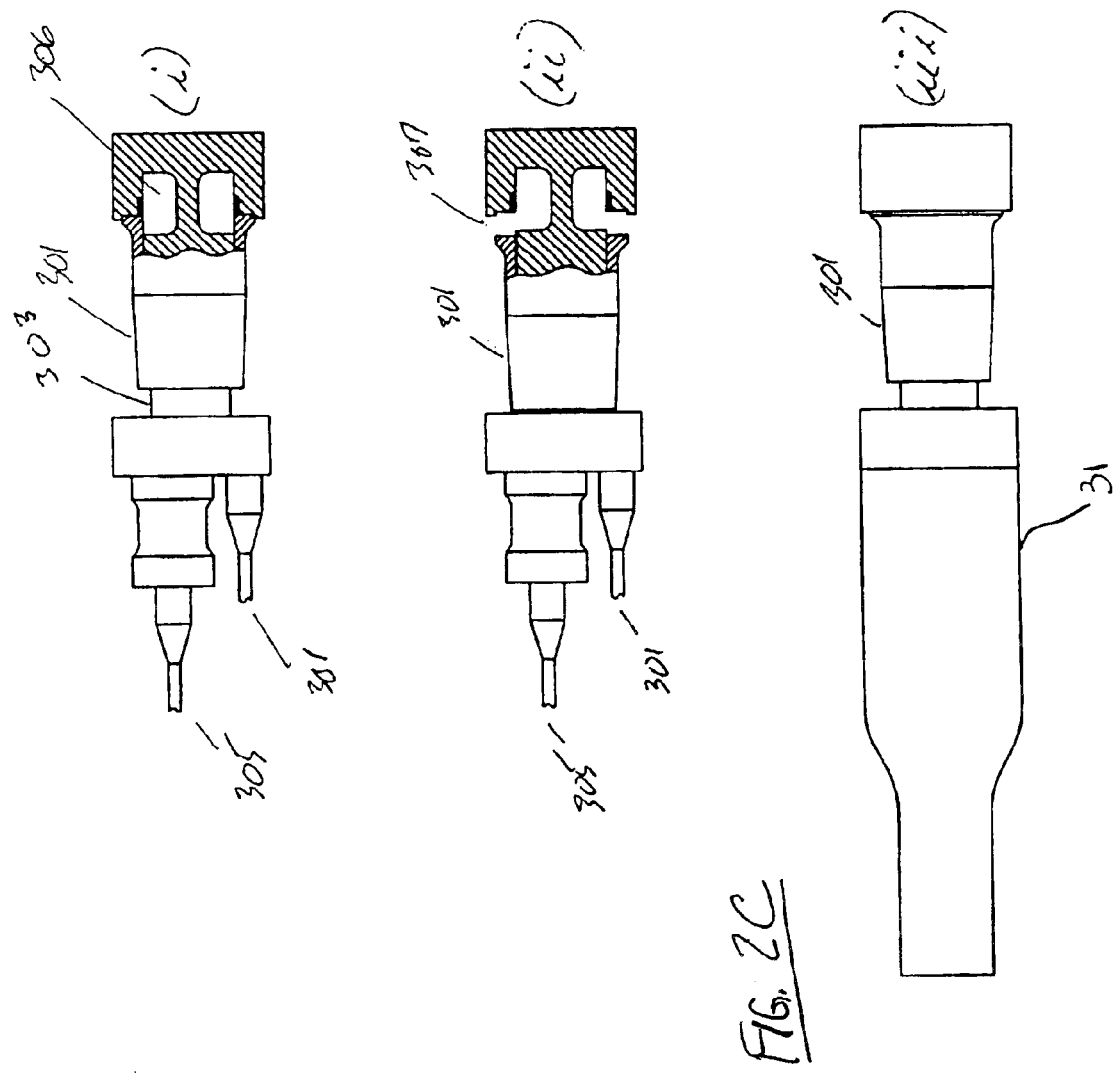

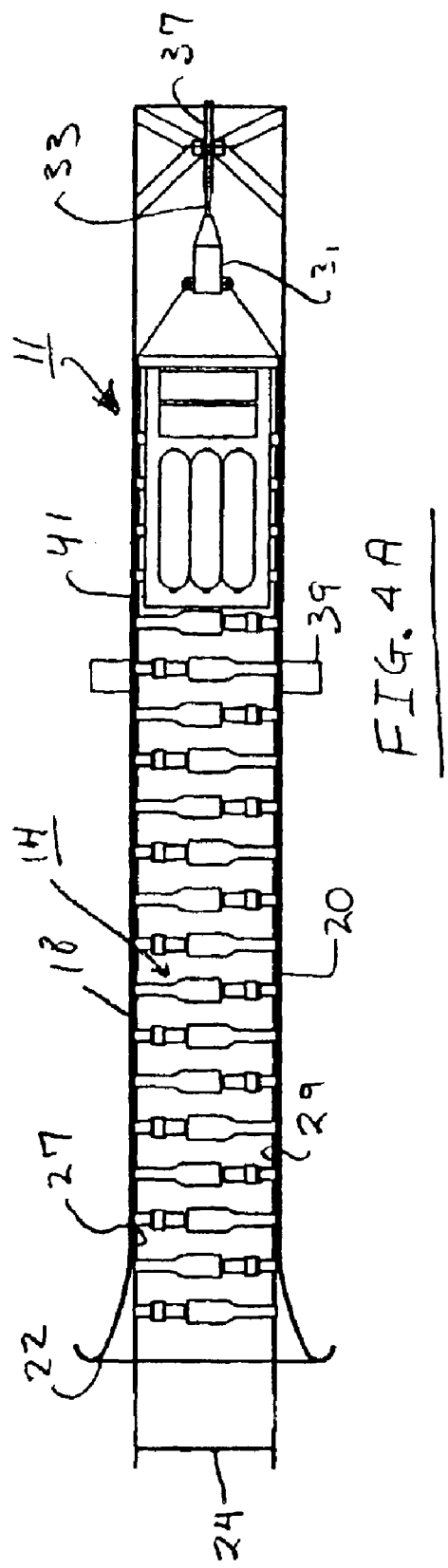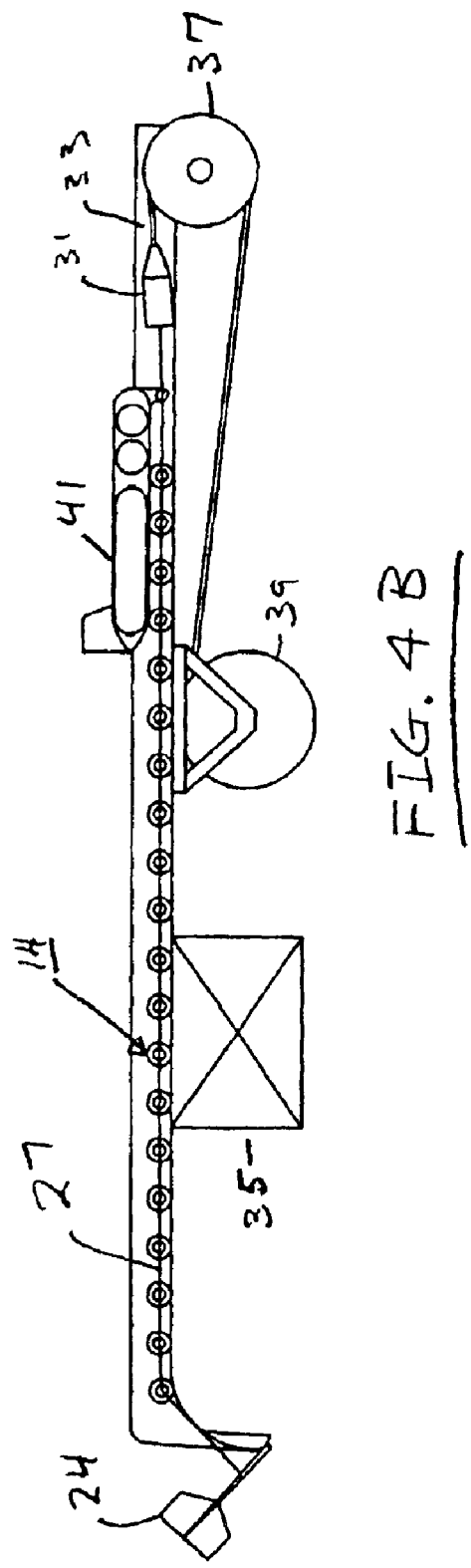

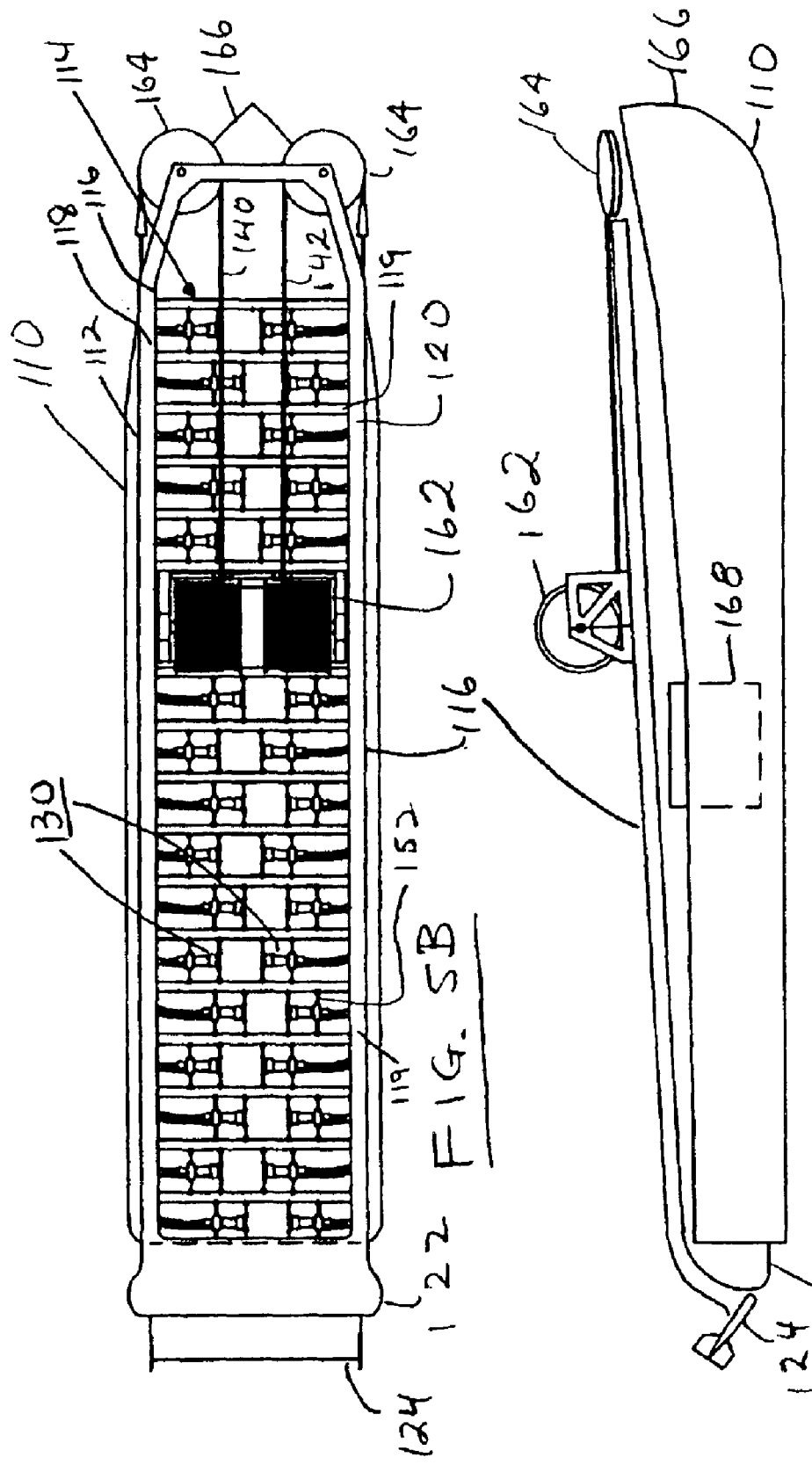

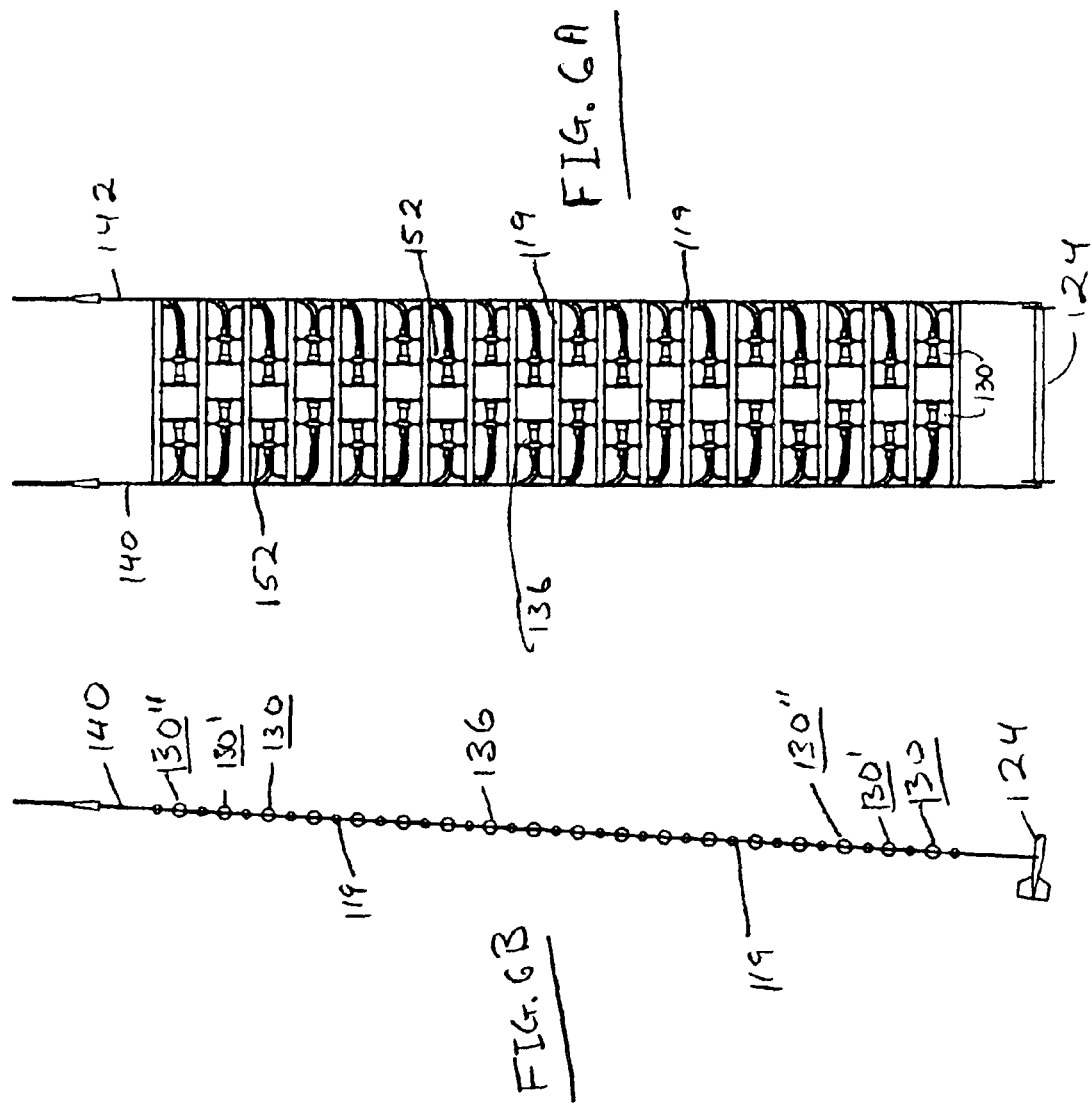

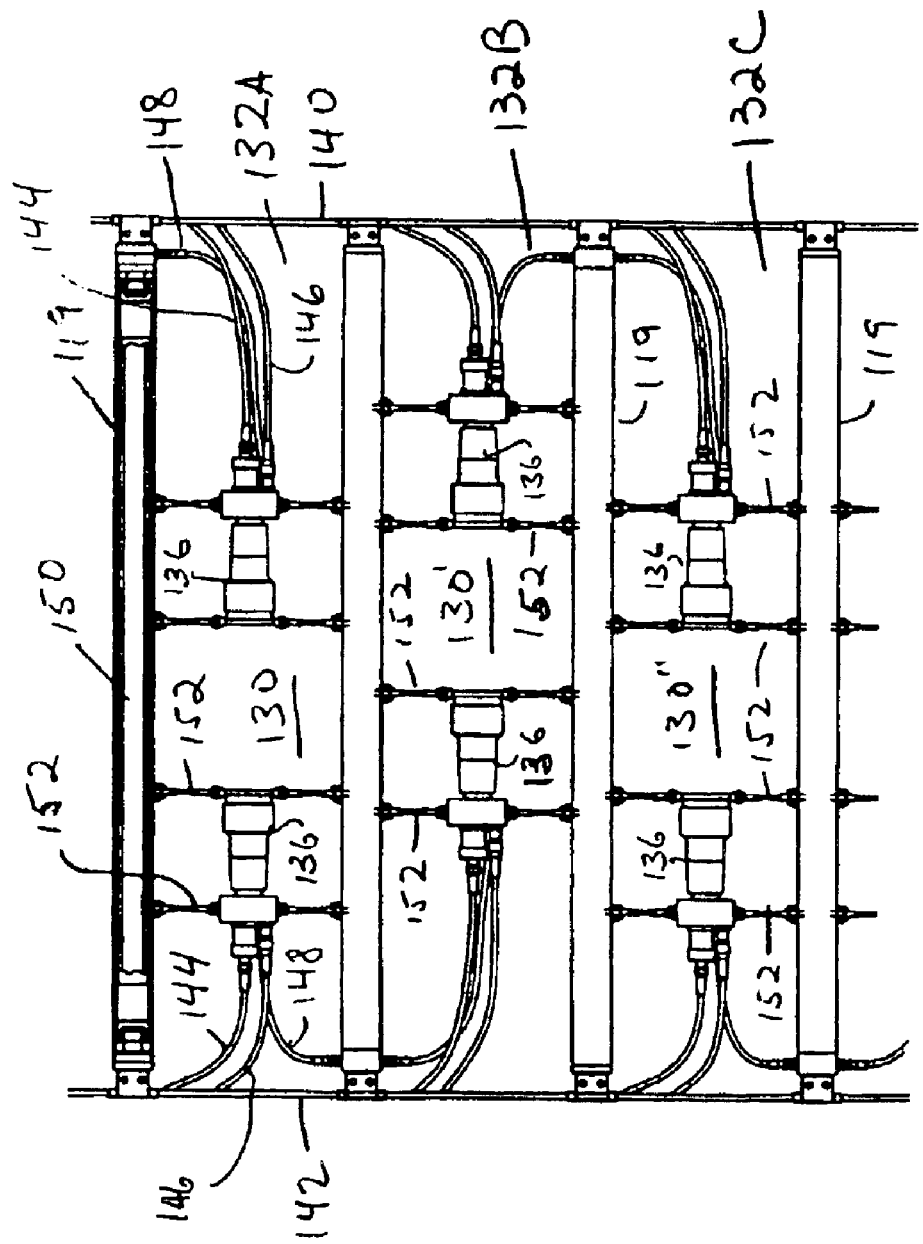

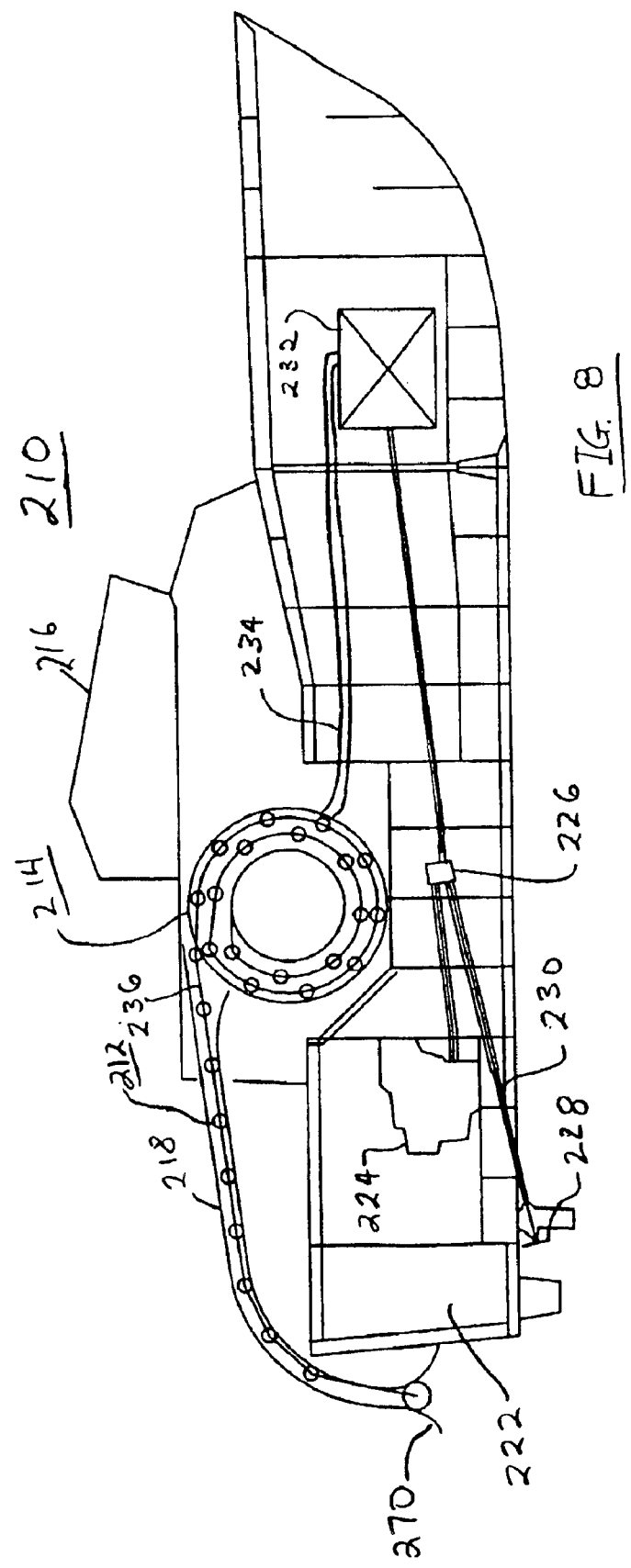

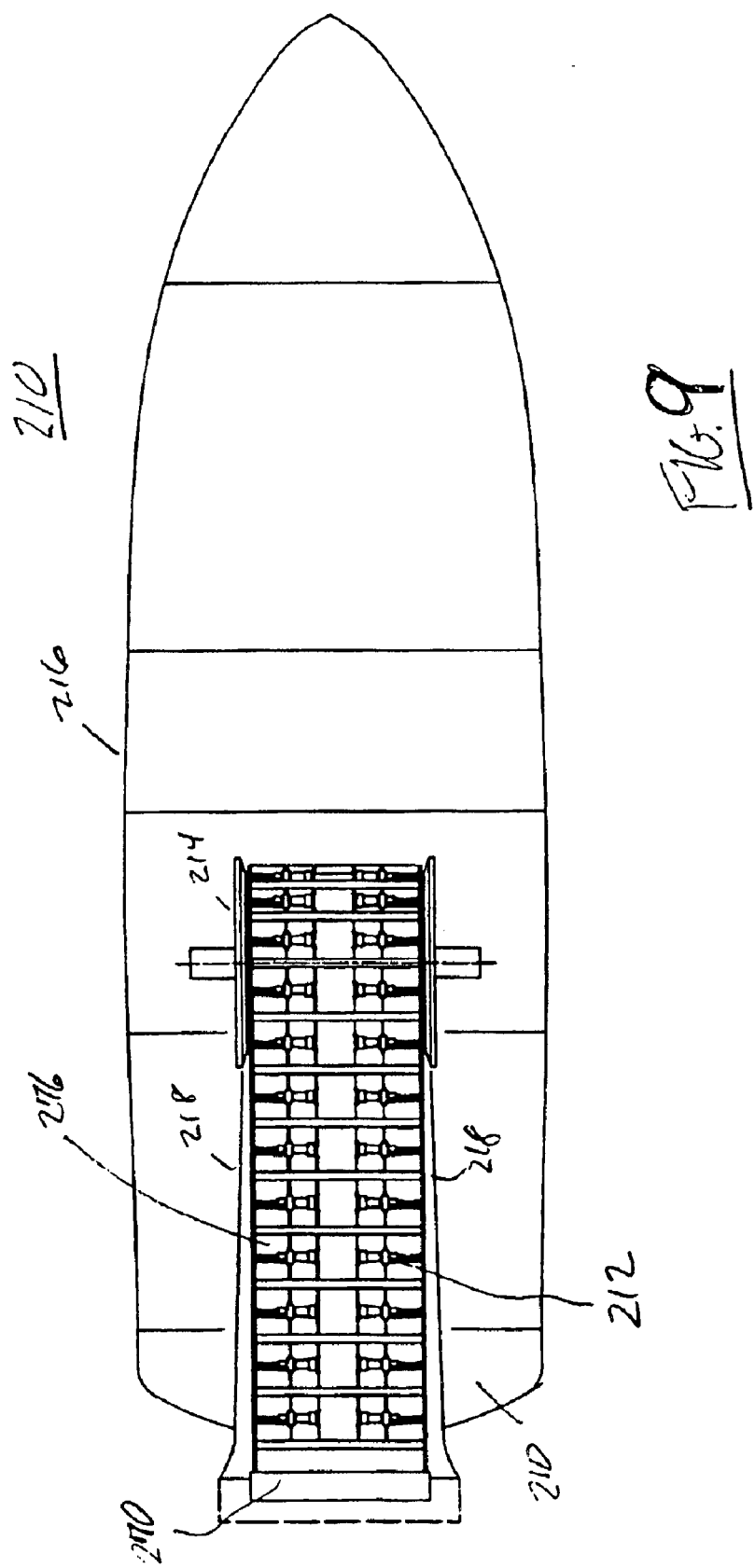

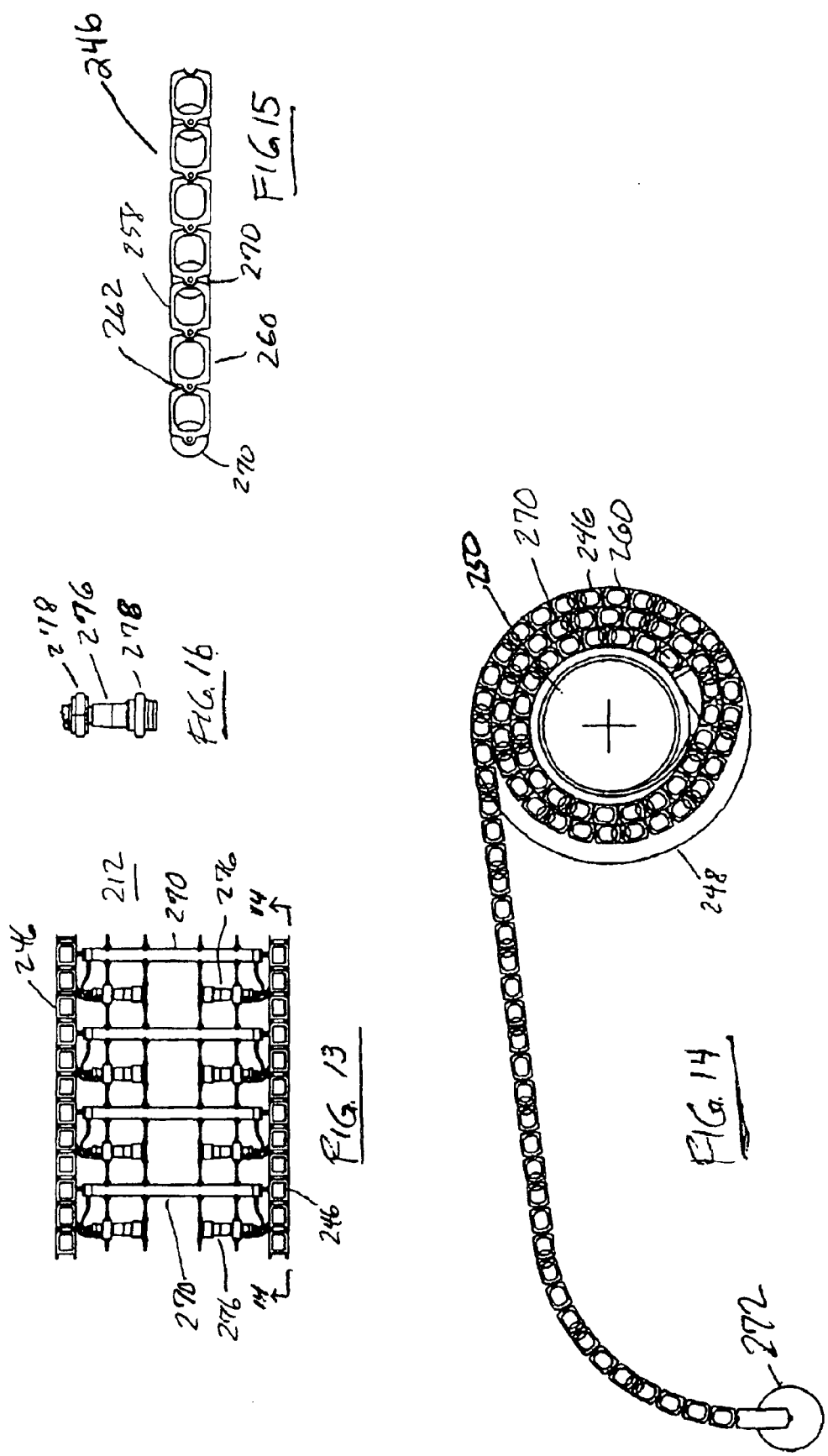

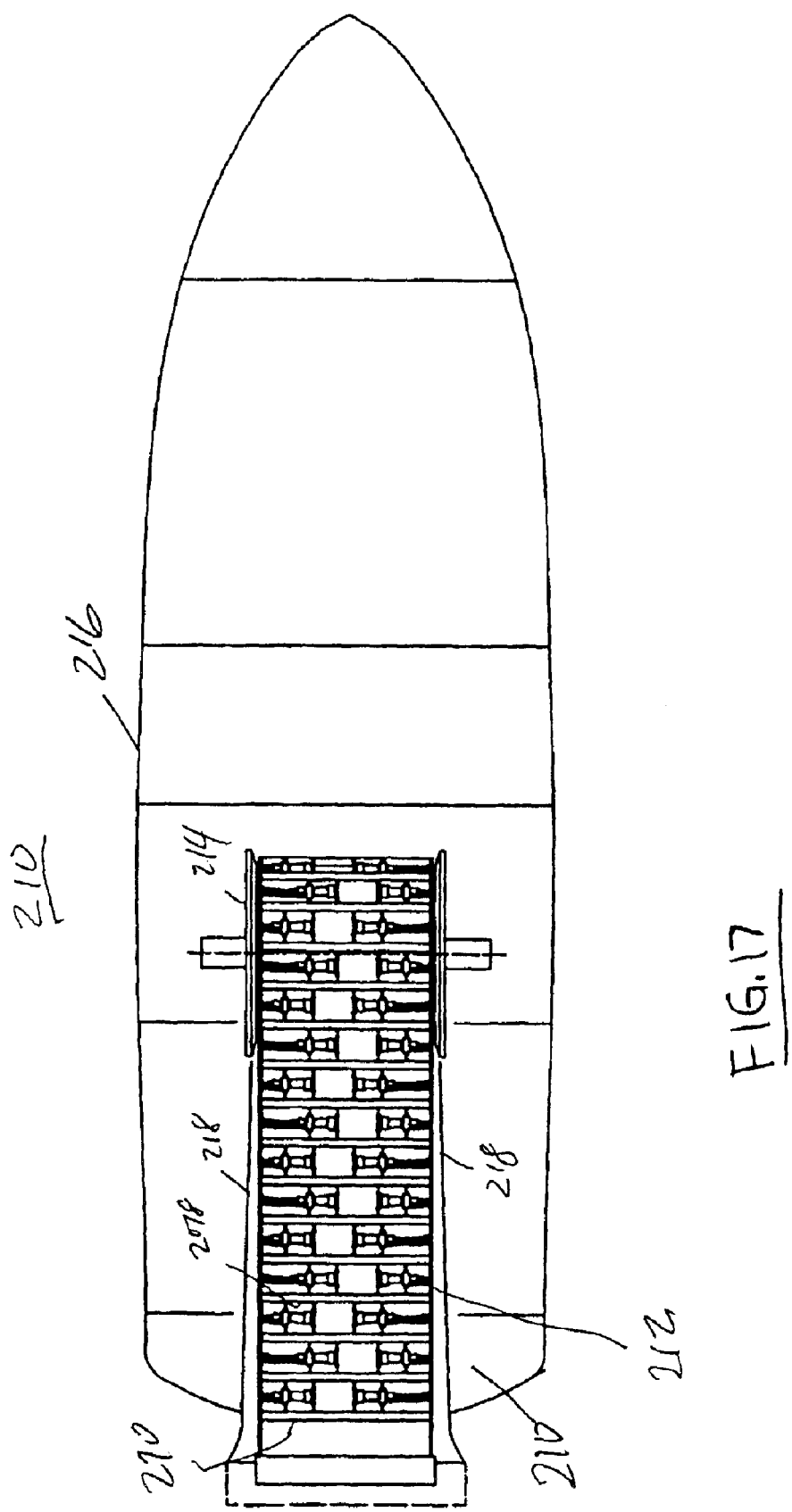

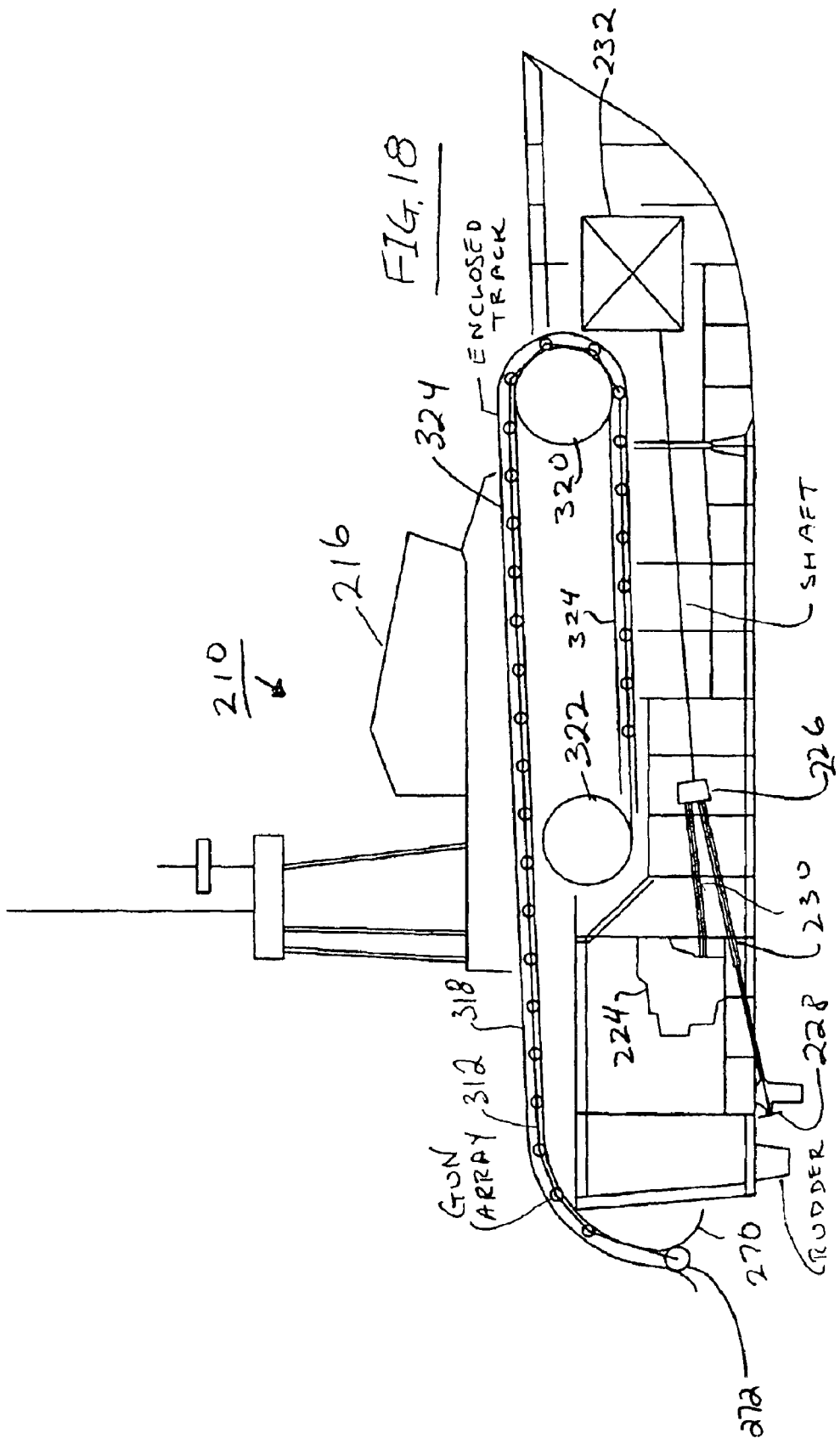

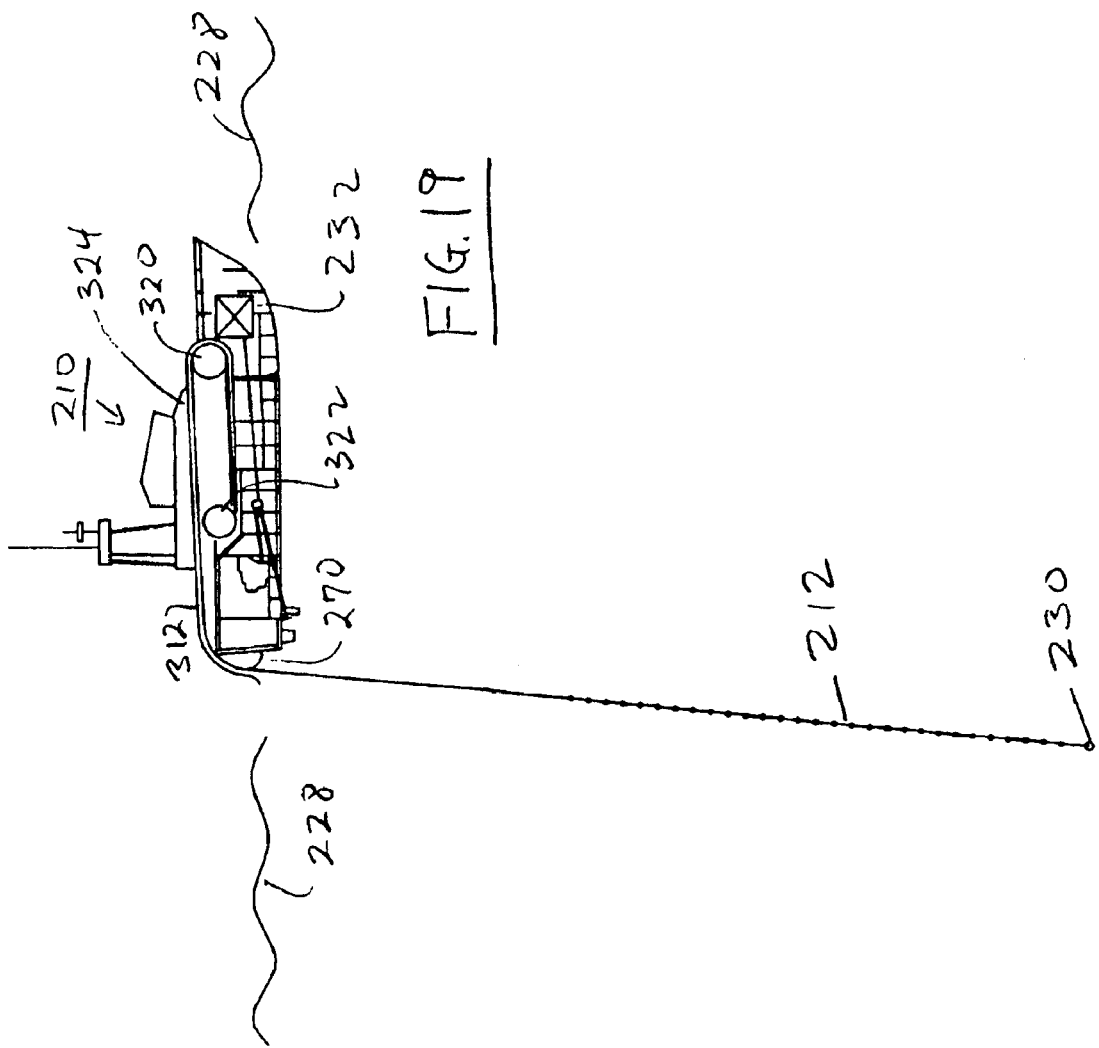

ing compressed air for operating air gun sources and for the location of umbilicals which support the array. The Bouyoucos et al. patent also may be referred to for the design of energy supply systems for the air guns of the array and control systems for actuating or shooting the array, with single shots or with clusters of shots.

ACOUSTIC SOURCE ARRAY SYSTEM MODULE FOR UNDERWATER OPERATION WHICH CAN BE INSTALLED ON A MOTORIZED BOAT

Priority is claimed to U.S. Application Ser. No. 60/265,032, filed Jan. 30, 2001, Ser. No. 60/290,056, filed May 10, 2001, and Ser. No. 60/309,648, filed Aug. 2, 2001.

DESCRIPTION

The present invention relates to underwater acoustic signal generation for the location of objects, such as submarines, and particularly to a multiple element, vertical acoustic source array, which is especially adapted for use from a small boat acting as a mobile platform which can rapidly transport the source array from location to location and provide for the efficient and rapid deployment and recovery thereof.

Acoustic source arrays are described, for example, in J. V. Bouyoucos. U.S. Pat. No. 5,995,452 of Nov. 30, 1999 and U.S. Pat. No. 5,481,733 of Nov. 24, 1998. The acoustic sources of the array are preferably air guns although electroacoustic devices may benefit by the teachings of this invention.

In accordance with the invention, such airgun acoustic sources are attached to bars, which with umbilicals along the sides of the bars, form a ladder. The guns are arranged between the bars so that their port positions are laterally staggered in successive rungs of the ladder. Alternatively, the guns may provide the bars of the ladder. The adjacent guns are then in inverted relationship so that their air discharge ports are laterally staggered, increasing the lateral port-to-port separation for a given vertical separation. Hoses or pipes which provide compressed air storage chambers may bridge the guns. Alternatively, compressed air storage chambers to support multiple, rapid firing sequences may be separately attached to the array. When the array is deployed underwater a certain minimum spacing between air gun ports must be established to minimize deleterious interactions between guns that tend to reduce or destroy the after-shot bubble oscillation contribution to the low frequency portion of total energy spectrum. This after shot oscillation provides a pedestal rise on the spectrum which is generally advantageous in increasing energy on target. See U.S. Pat. No. 5,995,452. The staggered port spacing enables an array of defined length to contain a greater number of guns than is the case with all guns in the same orientation. Accordingly, a given length of array can transmit increased acoustic energy.

The array and its pair of support umbilicals may be disposed between rails along sides of the deck of the boat. These two support umbilicals may be joined at the top to form a singular main umbilical which extends to a winch, including a reel or drum, which is used to deploy and retrieve the array.

Reference may be had to Bouyoucos et. al U.S. Pat. No. 5,841,733 for further information as to the design of spreader bars, particularly for providing manifolds containing compressed air for operating air gun sources and for the location of umbilicals which support the array. The Bouyoucos et al. patent also may be referred to for the design of energy supply systems for the air guns of the array and control systems for actuating or shooting the array, with single shots or with clusters of shots.

The array of airguns and associated umbilicals may be disposed between rails along sides of the deck of the boat. The umbilicals extend, as above noted, to a winch, which is used to deploy and retrieve the array.

The array together with associated apparatus such as the winch, sheave and compressor and electrical and pneumatics controls, may be contained in a module or assembly which includes a chassis or superstructure for the source system. The module can be plugged into the deck of a standard RHIB (Reinforced Hull Inflatable Boat) boat, as for example, an 11 meter RHIB.

Alternatively, the ladder assembly of gun bars and umbilicals, can be wound and unwound on a reel or drum. The drum may have flanges constraining and separating the spreader bars to maintain the guns in unique, radial positions so as to avoid deleterious gun to gun physical contact. A central hub may be independently rotatable to wind up the main umbilical separately from the ladder of spreader bars on which the sources are supported.

Alternatively, the array and its support umbilicals may be disposed along a curved track over a roller and which extends to the winch. The track is substantially within the hull of the boat. Similarly the flanged reel mechanism may be substantially within the hull of the boat.

The features of the invention will become more apparent from a reading of the following description in connection with the accompanying drawings in which:

FIGS. 2A and 2B are, respectively, front and side views of the array as deployed;

FIG. 2C shows the construction and operation of an airgun;

FIGS. 4A and 4B are respectively top and side views of the array module itself;

FIGS. 5A and 5B are, respectively elevational and plan views of a source platform in which an acoustic source array system of different configuration is installed, all in accordance with another embodiment of the present invention;

FIGS. 6A and 6B are respectively front and side views of the array of FIG. 5 as deployed;

FIG. 7 is an enlarged fragmentary, front view showing three successive sections of the array of FIGS. 5 and 6 having two air guns each, which are laterally or horizontally staggered, in the successive sections;

Figure 10:
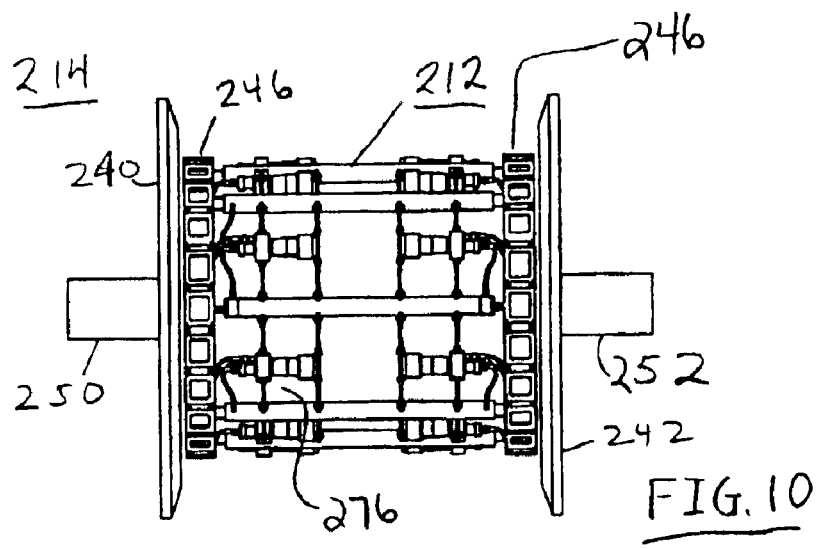
Figure 12:
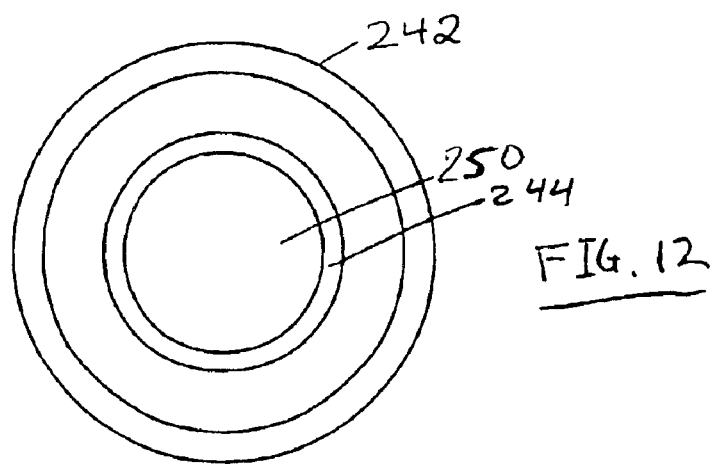
Figure 11:
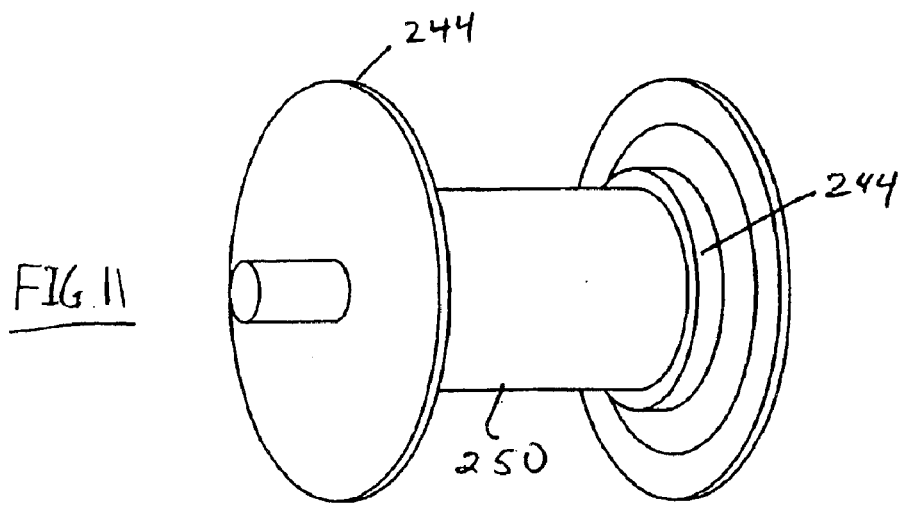

FIG. 8 is a diagram of a motor life boat, which may serve as a platform for the acoustic source array system in accordance with still another embodiment of this invention, this boat being manufactured by Textron Marine and Land Systems Division of Textron, Inc. having offices in New Orleans, La., USA, and FIG. 9 is a plan view in which an acoustic source array system is installed in the boat of FIG. 8, all in accordance with the present invention;

FIG. 10 is a front view schematically showing a drum or reel assembly carrying an array to provide a mechanism for stowage, deployment and recovery of the array;

FIG. 11 is a perspective view of the center drum core and flanges of the reel assembly as shown in FIG. 10;

FIG. 12 is a side view showing one of the flanges of the reel assembly and the drum core therein;

FIG. 13 is a fragmentary, schematic view illustrating several sections of the array including air guns mounted on chains so as to be located between adjacent spreader bars which also serve as energy storage vessels containing gas at high pressure;

FIG. 14 is a sectional view of the array shown in FIG. 13 wound on the reel, the view being taken along the lines 14—14;

FIG. 15 is a view of the portion of a line of articulated links which connect the spreader bars and enable the array to be wound helically in successive turns between the flanges of the reel;

FIG. 16 shows one of the guns show in FIG. 13

FIG. 17 is a plan view of the acoustic source array, similar to FIG. 9, but with the sources staggered in accordance with a teaching of the invention;

FIG. 18 is a schematic view of an array stowed aboard a motorized lifeboat in accordance with still another embodiment of the invention; and FIG. 19 is a view similar to FIG. 18 with the array deployed.

Referring to the drawings in FIGS. 1 through 4 there is shown, schematically, a RHIB boat 10 on which module 11 containing an array of air gun acoustic sources 14 is installed. The RHIB may be a 7 or 11 meter boat such as made by Zodiac-North America. The boat and the deployment and retrieval of the array may be remotely controlled by radio communication means not shown, but which are common in the art. The module 11 is plugged into receptacles on the deck 12 of the boat 10, between its pontoons 13 and 15 (See FIG. 3). The module 11 has a chassis or a superstructure 16 which is mounted on the deck 12, and defines a rack made up of two array storage rails 18 and 20 and which includes a curved section 22 defining a deployment fairlead. A depressor or guide fish 24 at the lower end of the array 14 extends beyond the rails and the deployment fairlead. The array is designed in accordance with the invention to achieve the dimensional constraints of being capable of stowage on a small boat or launch, typified by the RHIB, and also to provide the desired total acoustic output when the guns of the array are fired. In other words the design provided by the invention enables the array to have the maximum number of air guns to enhance the acoustic output from the array, while simultaneously achieving a port to port spacing that maximizes the acoustic output of individual guns. A certain minimum port-to-port spacing is a requirement of the array for minimizing deleterious interaction between the guns that may tend to destroy the aftershot bubble oscillation contribution to the acoustic energy output spectrum. This deleterious interaction is minimized with the array design provided by the invention within the space constraints imposed for stowage on the small boat 10.

The array design is characterized by pairs of air guns 30 (See FIG. 2A). The illustrated array has ten pairs of air guns 30 which are disposed generally horizontally when the array is deployed as shown in FIGS. 2A and 2B. FIG. 2C illustrates a typical airgun, its operation and its combination with a sleeve for the purposes of streamlining the gun to reduce drag for the purposes of towing as illustrated in FIGS. 2A and 2B.

Each airgun of the pair 30 is a commercial device such as manufactured by Input/Output of Alvin, Tex. It contains a sleeve valve 301 guided on a shaft 303. Compressed air, at a pressure of 2000 to 3000 psi, is introduced through an inlet 301. With the sleeve valve in its closed position (i), as in FIG. 2C, the cavity 306 is charged. Upon passage of an electrical signal through connection 305, the valve 301 can be driven backward abruptly, as in (ii) of FIG. 2C, to open the port 307 to allow for abrupt release of the compressed gas which provides a powerful, impulse signal into the surrounding medium. Commercial guns automatically reseat themselves. Small airguns, of the order of 10 cu. in. capacity can be refired at rates of ½ to 1 second repetition period.

In FIG. 2C(iii) the airgun assembly 30 is shown with a protective, drag reducing sleeve 31 over the electrical control and high pressure pneumatic connections to the gun, to provide an element of the array 14 in FIG. 2A.

The array of FIGS. 2A and 2B is characterized by the staggered positioning of the air guns within each pair 30. This offset or staggered positioning provides minimum longitudinal spacing of the guns to achieve a shortened array while maintaining the necessary port-to-port spacing.

Figure 3A:
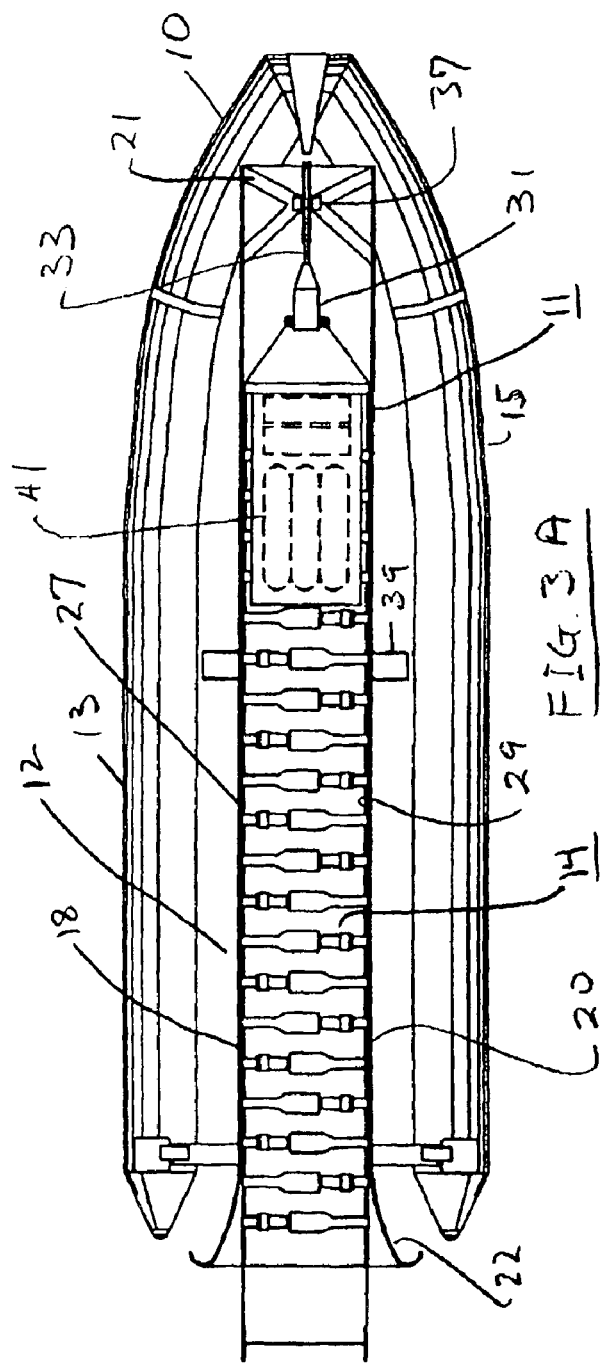
FIGS. 3A and 3B are respectively top and side elevational views of the air gun array module of FIG. 1 on a RHIB, with the array in stowed position.
Figure 3B:
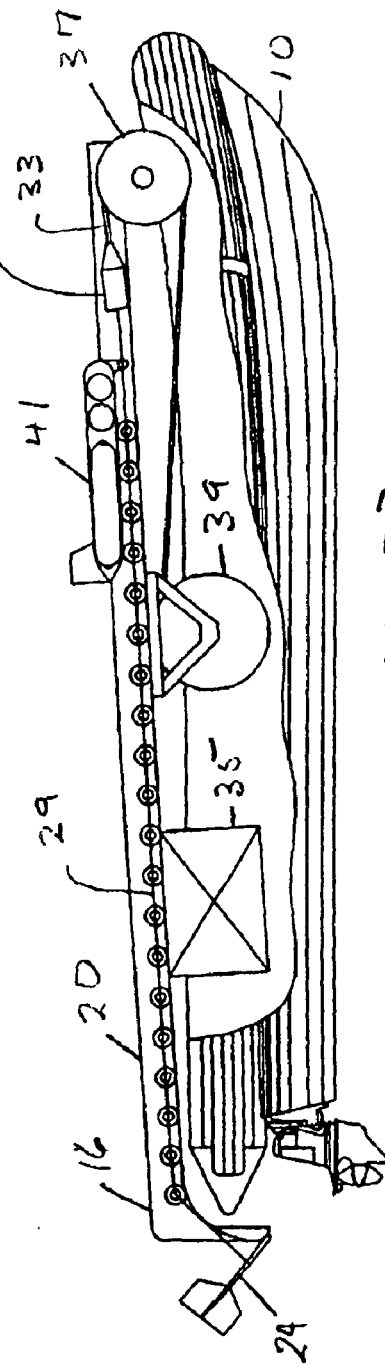

The array support structure 16 in FIG. 3 has stiffening cross members 21 between the sides 18 and 20 which support a cable sheave 37. The sides 18 and 20 define a rack along which the ends of the guns are guided. The guns are the rungs of a ladder the sides of which are cables 27 and 29. The depressor 24 is connected at the lower end of the cables 27 and 29.

The cables 27 and 29 are joined at a junction box 31 to an umbilical cable 33 which carries electrical control signals and compressed air from a compressor 35 to the guns.

The compressor is attached to the structure 16. The compressor may be driven by a compact hydraulic motor which receives its power from a hydraulic pump driven by the main propulsion system.

A sheave 37, on the structure 16, guides the umbilical 33 to a drum of a winch 39. An air hose (not shown) from the compressor 35 supplies the guns 30 via the winch and the umbilical. An air storage (manifold) and control unit 41 is in a faired body attached to the cables 27 and 29.

Referring to FIGS. 5A and 5B there is shown, schematically, RHIB boat 110 on which an alternative array of air gun acoustic sources 114 is stowed. As with the designs of FIGS. 1 and 2, this configuration is particularly beneficial when the length of the array, as limited by the platform, is more limited than its allowable width. The invention enables more airguns to be installed per unit length of the array, thereby increasing the acoustic power output per unit length, while avoiding deleterious effects on spectrum shape which can arise upon placing individual gun ports too close to one another.

Figure 1:
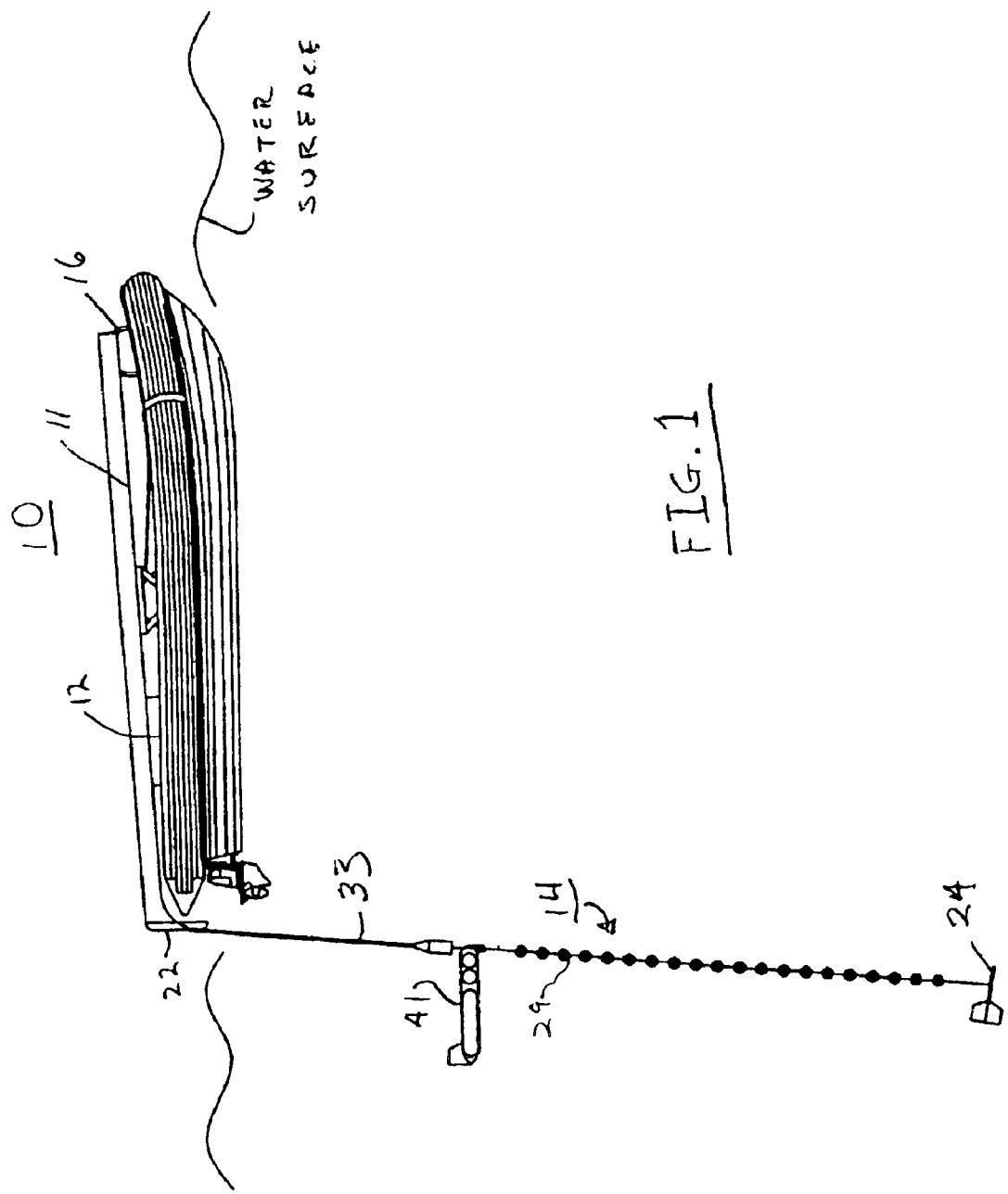
FIG. 1 is a side view of a reinforced hull inflatable boat (RHIB) in which a plug-in modularized air gun array system is installed, the view showing the array deployed, all in accordance with the present invention.

The configurations of FIGS. 5, 6 and 7 also provide for spreader bars between gun pairs to act also as compressed air storage vessels thereby eliminating the need for a separate air storage assembly as represented by element 41 in FIGS. 1, 2, and 3.

Stowage of the airgun array is on the deck 112 of the boat 110. A superstructure 116 mounted on the deck 112 defines two array storage rails 118 and 120 and forms a rear transom 122 defining a deployment fairlead. A depressor or guide fairing 124 at the lower end of the array 114 extends beyond the rails and the bumper. The array is designed in accordance with the invention to achieve the dimensional constraints of being capable of stowage on a small boat or launch, typified by the RHIB, and also to provide the desired maximum acoustic output when the guns of the array are fired. In other words, the design provided by the invention enables the array to possess the maximum number of air guns for a given array length, as limited by platform dimensions, while simultaneously achieving a port to port spacing that will maximize the individual gun acoustic output.

The array design is characterized by pairs of air guns 130, as shown in FIGS. 5B, 6A and 7. The illustrated array has eighteen pairs of air guns 130 which are disposed generally horizontally when the array is deployed as shown in FIG. 6A. The array is characterized by the staggered positioning of the air gun pairs 130. This positioning is best shown in FIG. 7 for the air gun pairs 130, 130', 130" in three successive sections of the array 132A, 132B, and 132C. While the pairs of guns 130 and 130", in alternate sections 132A and 132C, are generally in alignment longitudinally of the array, the guns 130' in the intermediate section 132B are offset laterally. As shown in FIG. 5B the alternate section guns are also in longitudinal alignment but are offset horizontally in these figures. This offset or staggered positioning provides sufficient port-to-port spacing between the air release ports of the guns to minimize the interactions which affect the energy spectrum of the acoustic signal from the array, while minimizing the total array length.

In order to maintain the prerequisite staggered relationship of the guns and to support them in the array and further to enable deployment and retrieval of the array, the following structural arrangement is illustrated.

As shown in FIGS. 5B, 6A and 7, the array uses a pair of array suspension cables 140 and 142. These cables are bundled to the conduits 144, 146 and 148. The conduits 144, 146 and 148, which are positioned on both sides of the array, form the umbilicals attached to the suspension cables 140 on the right and 142 on the left. The cables provide the sides of a ladder, the rungs of which are provided by spreader bars 119, the top spreader bar being shown in partial section as containing a compressed air chamber or manifold 150. Similar manifolds are in each of the bars 119. The guns 130 are attached to successive bars 119 by straps, such as turn buckles 152. The cables 146 are air hoses which convey compressed air to the guns. The cables 144 are signal cables which carries trigger signals to shoot the guns. The actual firing-time signals are carried back to the boat 110, via the umbilicals, by way of the cables 148. In typical operation the returned signals and the trigger signals are compared to ensure that the guns are fired with the timing dictated by the trigger signals. A typical feedback controller may be used to make this comparison and to control the generation of the individual trigger signals. All of the guns may be of the same size as, for example, 10 cubic inch guns. The design is not restricted to guns of the same size.

The bars 119 have their opposite ends in guided relationship with the rails 118 and 120 of the support platform, as in FIG. 5B. The suspension cables and umbilicals are wrapped around a winch 162 which may be mounted on the superstructure 16. A pair of sheaves 164 near the bow 166 of the boat 110 define the path for the cables and the umbilicals 140 and 142. Air from a compressor 168 may be supplied, via hoses and through the core of the winch to the umbilical, to carry the compressed air to the manifold chambers 150 in the bars 119.

A further superstructure (not shown) over the rail-forming superstructure 16 may be used to support the bridge, motors, navigation equipment and rudder and speed control for the boat 110. The boat and airgun source system may be remotely controlled; then a bridge and manual steering mechanism may not be required.

Referring to FIGS. 8 and 9 there is shown a motorized life boat 210 of the type, which is available from Textron, Inc. This boat has a length of 47 feet from bow to stern and a beam width of 14 feet. The boat is shown converted to provide a platform for the acoustic source array system. As shown in FIGS. 8 and 9 the boat 210 supports the acoustic source array 212 with its reel mechanism 214 behind the bridge 216, in an area which contained cabin space before conversion of the boat 210. The reel is located partially within the hull. The array is guided by tracks 218 between the reel and the stern of the boat 210. A chute (such as shown at 270) may be used. This chute engages the array as it is over boarded and recovers it to align the array to enter the reel along the tracks centered and parallel to the reel, thereby avoiding snagging of the array as it is deployed and recovered.

The boat 210 has a number of watertight compartments, which are designed to enable the boat to right itself if capsized. There is an engine compartment containing dual diesel engines 224 and machinery associated therewith. The engines are connected through gear boxes 226 and drive the dual propellers 228 via drive shafts 230. One of the dual diesels may be disengaged from its propeller and engaged to one of two compressors 232 (the extra compressor is optional but provides redundancy). The hose from the compressor is connected via piping or conduit 234 to the umbilicals 236 on the reel 214. To transmit acoustic signals the boat is slowed and only one diesel engine need be used so as to leave the other engine available for driving the compressor. The later operation occurs as the array is being deployed, and may be sustained during deployment.

Referring to FIGS. 10 through 16, the reel assembly 214 is shown as having flanges 240 and 242, each with a circular step 244 upon which support chain links 246 of articulated sections are wound.

A central drum assembly 250 is separately driven by a motor, preferably a hydraulic motor 252. This central drum winds up or deploys the umbilical or umbilicals, which may be up to 300 feet in length. A separate drive (motor and gear box) 256 drives the flanges of the main reel, which carry the array 212.

Each articulated link of the chain 246 has top and bottom surfaces 258 and 260 that are curved so that the articulated links can wrap on top of one another between the flanges 240 and 242. The curvature of the top 258 and bottom 260 of each link will be different, and each link will have different top and bottom curvatures depending upon the radial distance of the link from the axis of the reel when the array is stowed on the reel, as shown in FIGS. 10 and 14. Connecting pins 262 connect each of the articulated links in the chain 246.

The spreader bars 270 span the links and form the rungs of the ladder. As shown in FIG. 14 and also in FIG. 18 a bottom depressor 272 may be connected to the last spreader bar. This depressor may provide a volume for compressed air storage for the air gun sources.

The air guns 276 are connected to the spreader bars 270 by chains, which spreader bars hold the guns at appropriate separate distances from each other. Electrical signals for operating the air guns can extend along the chain to the sources. The spreader bars may serve as gas storage manifolds.

As shown in FIG. 16 plastic or rubber collars 78 may be used as bumper rings so as to protect the sources if they move on the chain supports, thereby preventing damage if adjacent sources contact each other.

The acoustic source array in FIG. 9, and its further embodiments including the reeling system illustrated in FIGS. 10 through 16, illustrate an array configuration in which successive levels of airguns are not staggered in accordance with the teachings hereinbefore set forth. For comparison, FIG. 18 illustrates the longitudinal compactness that the staggered arrangement provides by shortening the overall array length for a given number of guns, as increasing the number of guns for a given array length in the presence of the constraint of a fixed, minimum gun port to gun port spacing.

Referring to FIGS. 18 and 19, the converted lifeboat 10 is shown with an acoustic source array 312 mounted generally within the hull along a track 318. The track carries the array along a curved path around a drum roller 320 to a winch 322. The array may be similar to the array shown in the preceding figures and is comprised of spreader bars 324 connected between chain links so that they can pivot as they travel around the drum roller 320 and over the stern.

When it is deployed as shown in FIG. 19, the array 212 extends from umbilicals 312 and is maintained in a generally downward direction from the surface 228 of the water by a bottom depressor 230. This array may use the staggered embodiments show in FIG. 17 or in FIG. 2A. The fold back of the array on board the platform 210 further extends its effective length.

Variations and modifications on the design of the boat and the array system, within the scope of the invention, will undoubtedly suggest themselves to those skilled in the art. Accordingly the foregoing description should be taken as illustrative and not in a limiting sense.

What is claimed is:

1. A mobile acoustic source array system comprising an array support platform, and a plurality of acoustic sources in a plurality of different generally linearly and lengthwise spaced levels each with a single source, comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length.

2. A mobile acoustic source array system comprising an array support platform, and a plurality of acoustic sources in a plurality of different lengthwise spaced levels comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length, and where said acoustic sources are airguns having air discharge ports which are laterally spaced in said adjacent levels due to said staggered relationship.

3. A mobile acoustic source array system comprising an array support platform, and a plurality of acoustic sources in a plurality of different lengthwise spaced levels comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length, and where said acoustic sources are airguns having air discharge ports which are laterally spaced in said adjacent levels due to said staggered relationship.

4. A mobile acoustic source array system comprising an array support platform, and a plurality of acoustic sources in a plurality of different lengthwise spaced levels comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length, and where said acoustic sources are airguns having air discharge ports which are laterally spaced in said adjacent levels due to said staggered relationship.

5. A mobile acoustic source array system comprising an array support platform, and a plurality of acoustic sources in a plurality of different lengthwise spaced levels comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length, and where said acoustic sources are airguns having air discharge ports which are laterally spaced in said adjacent levels due to said staggered relationship.

6. An acoustic source array system comprising a motorized source platform boat, a mechanism on or wholly or partially within a hull of the boat providing the platform, and mechanisms forming the ends of a ladder defined by spreader bars connected between flexible lines for supporting and spacing apart in storage the acoustic transducers of the array.

7. An acoustic array system according to claim 6 wherein said mechanism includes a reel having a central drum adapted to wind and unwind an umbilical connected to the ladder, flanges connected to the central drum and rotatable independently of the central drum to enable winding of the umbilical on the drum separately from the ladder which supports the acoustic sources.

8. The system according to claim 6 wherein the ladder of spreader bars is interconnected by contiguous links, each of different curvature, and a reel having flanges between which flanges the spreader bar ladder with its interconnecting links is wound helically when the array is stowed.

9. An acoustic source array system comprising a boat providing an array support platform, an array comprising a plurality of acoustic sources having acoustic impulse discharge ports in successive sections spaced from each other length-wise along the array, means supporting the sources in the array in staggered positioning sufficient to provide at least a minimum spacing between the sources in said successive sections, to minimize deleterious acoustic interaction between the sources when producing acoustic signals while minimizing array length.

10. An acoustic array system according to claim 9 wherein the sources are air guns and the sections are defined between bars providing successive rungs of a ladder, sides of the ladder being provided by cables along the sides of the bars, and a structure carried on the boat for supporting the array and enabling the deployment and retrieval of the array off the end of a boat.

11. The system according to claim 9 wherein the sources are air guns which in alternate sections are generally longitudinally aligned but are offset laterally from guns in adjacent sections of the array.

12. The system according to claim 10 wherein the cables to which the bars are connected are part of an umbilical connecting the array to the boat carrying compressed air and electrical signals between the boat and the guns.

13. The system according to claim 9 wherein the sources are air guns in successive said sections are inverted with respect to each other so that their air discharge ports have said staggered positioning.

14. The system according to claim 13 wherein hoses providing compressed air storage manifolds are disposed in bridging relationship with the guns in at least some of said sections.

15. An acoustic source array system comprising a boat providing an array support platform, a module removably attachable to said boat, receptacles on said boat, in which said module is received in plugged in relationship such that said module is removably attachable to said boat, said module containing an array comprising a plurality of acoustic sources, and means in said module for deploying, retrieving and powering said sources.

16. An acoustic array system comprising a boat providing an array support platform, a module removably attachable to said boat, said module containing an array comprising a plurality of acoustic sources, and means in said module for deploying, retrieving and powering said sources, the sources are air guns providing successive rungs of a ladder, sides of the ladder being provided by cables along the ends of the guns, and rails along which said cables and said guns are guided in the deployment and retrieval of said array.

17. An acoustic array system comprising a boat providing an array support platform, a module removably attachable to said boat, said module containing an array comprising a plurality of acoustic sources, and means in said module for deploying, retrieving and powering said sources, the sources are air guns which are generally longitudinally aligned and are in laterally offset or in alternately inverted relationship in adjacent sections of the array.

18. The system according to claim 16 connected to an umbilical wound around a drum assembled as part of said module, a winch including said drum which reels and unreels said umbilical to deploy and retrieve said guns.

19. The system according to claim 18 wherein said module has a sheave around which said cable travels to said drum.

20. The system according to claim 19 wherein a compressor providing compressed air for the guns is part of said module.

21. The system of claim 15 wherein said module has a support structure with which said array and said means in said module are assembled into a unitary structure removably attachable in plugged in relationship onto said boat.

* * * * *

UNITED STATES PATENT AND TRADEMARK OFFICE
CERTIFICATE OF CORRECTION

PATENT NO. : 6,870,795 B2
DATED : March 22, 2005
INVENTOR(S) : John V. Bouyoucos and Dennis R. Courtright It is certified that error appears in the above-identified patent and that said Letters Patent is hereby corrected as shown below:

Column 7,
Lines 52-64, Claim 3 should read as follows:
3. A mobile acoustic source array system comprising an array support platform, and a plurality of acoustic sources in a plurality of different lengthwise spaced levels comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length, and where said acoustic sources are 10 cu. in. airguns and the predetermined source to source spacing is of the order of 2 feet as measured between the airgun ports.

Column 7, line 65 - Column 8, line 10,
Claim 4 should read as follows:
4. A mobile acoustic source array system comprising an array support platform, and a plurality of acoustic sources in a plurality of different lengthwise spaced levels comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length, and where said sources are airguns and said airguns in said adjacent levels of said vertically-oriented array are oriented in opposite directions.

UNITED STATES PATENT AND TRADEMARK OFFICE
CERTIFICATE OF CORRECTION

PATENT NO.    : 6,870,795 B2
DATED         : March 22, 2005
INVENTOR(S)   : John V. Bouyoucos and Dennis R. Courtright It is certified that error appears in the above-identified patent and that said Letters Patent is hereby corrected as shown below:

Column 8,
Lines 11-23, Claim 5 should read as follows:
5. A mobile acoustic source array system comprising an array support platform, and a plurality of acoustic sources in a plurality of different lengthwise spaced levels comprising the array, means for deploying said array in a generally vertical orientation with the different levels of said plurality of acoustic sources in a staggered relationship laterally with respect to one another in adjacent ones of said levels so as to maximize the number of acoustic sources in the array for a predetermined acoustic source to acoustic source spacing while minimizing the array length, and where the different levels of the array each contain a pair of airguns whose ports are spaced horizontally at a predetermined port-to-port spacing, and where the gun pairs in neighboring levels are offset horizontally to achieve the same predetermined spacing between ports of adjoining levels.

Signed and Sealed this

Thirty-first Day of May, 2005

JON W. DUDAS
*Director of the United States Patent and Trademark Office*